United States Patent [19]

You

[11] Patent Number: 5,061,056
[45] Date of Patent: Oct. 29, 1991

[54] SIDEVIEW MIRROR FOR AUTOMOBILES

[75] Inventor: Ki S. You, Icheon, Rep. of Korea

[73] Assignee: Poong Jeong Industrial Co., Ltd., Kyungki-do, Rep. of Korea

[21] Appl. No.: 499,045

[22] Filed: Mar. 26, 1990

[30] Foreign Application Priority Data

Nov. 29, 1989 [KR] Rep. of Korea .................. 89-17404

[51] Int. Cl.⁵ .................. G02B 7/18; A47F 7/14
[52] U.S. Cl. .................. 359/872; 248/475.1; 248/900; 359/841
[58] Field of Search .................. 350/604–608, 350/611, 612, 623–627, 637, 638, 632–635; 248/466–498, 584–602, 900

[56] References Cited

U.S. PATENT DOCUMENTS

| 4,413,803 | 11/1983 | Ross | 248/475.1 |
| 4,464,017 | 8/1984 | Wada | 248/900 |
| 4,836,490 | 6/1989 | Häuser et al. | 350/632 |
| 4,919,525 | 4/1990 | Gilbert | 350/632 |

FOREIGN PATENT DOCUMENTS

| 3608 | 2/1979 | Fed. Rep. of Germany | 248/900 |
| 56-143135 | 10/1981 | Japan | 350/604 |

Primary Examiner—Bruce Y. Arnold
Assistant Examiner—Thong Nguyen
Attorney, Agent, or Firm—Lackenbach Siegel Marzullo & Aronson

[57] ABSTRACT

An outside back mirror is disclosed which comprises a base plate, a hinge structure and a mirror housing, and is characterized in that, a through hole, retaining sections, metal pieces, and a fitting groove are provided on the assembling plane of the base plate, while a through hole, retaining sections, a groove with a spring hanging groove, permanent magnets, and another fitting groove are provided on the assembling plane of the mirror housing. According to the present invention, the mirror housing is attached firm enough to withstand against any impacts and vibrations, and has a simplified structure and uses small number of components, thereby contributing to saving the manufacturing cost and improving the productivity.

10 Claims, 3 Drawing Sheets

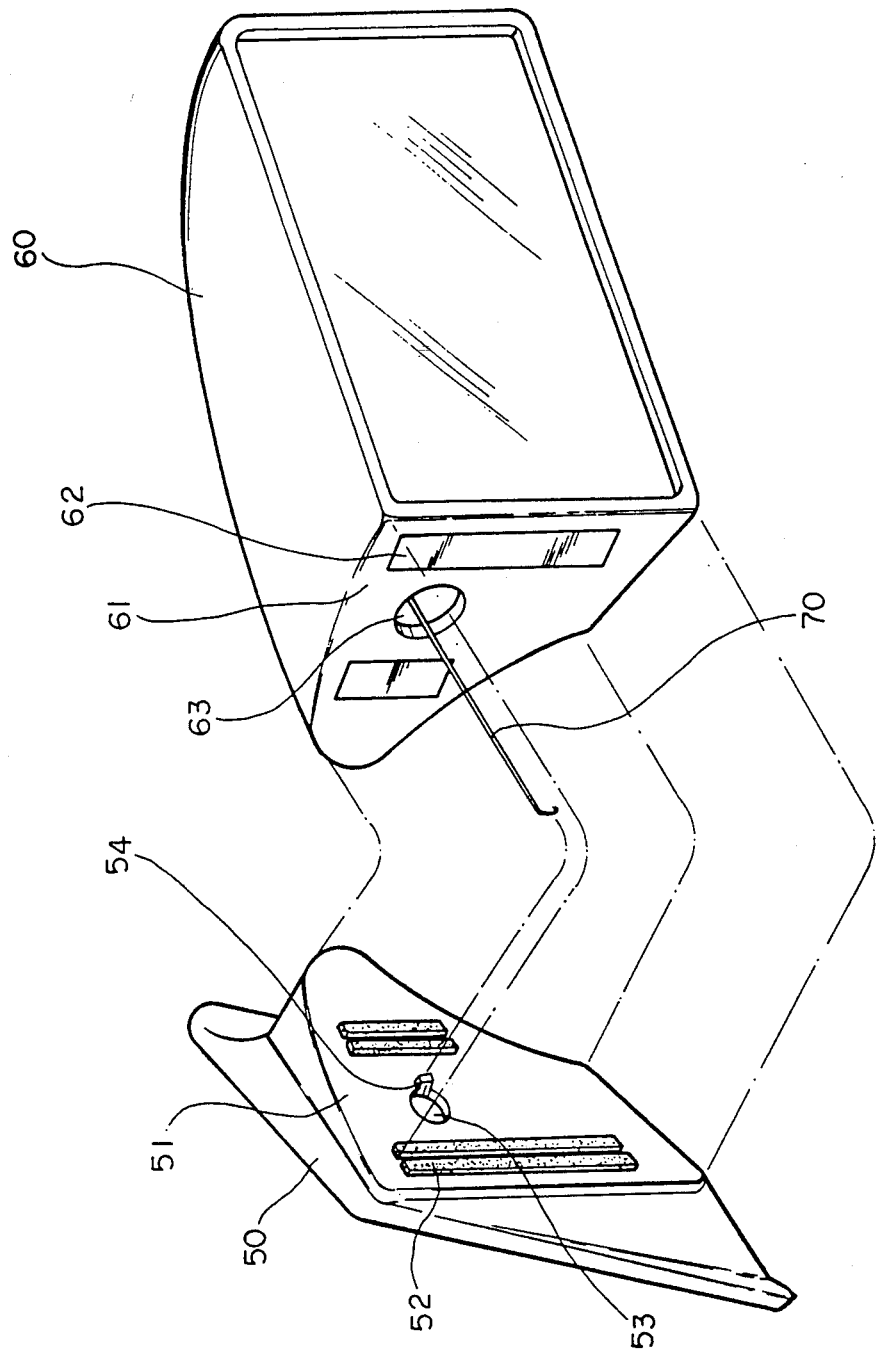

SIDEVIEW MIRROR FOR AUTOMOBILES

FIELD OF THE INVENTION

The present invention relates to an outside mirror of an automobile, which is installed on both of the front doors of the automobile, and which enables the driver to observe traffic in the rear of the automobile.

BACKGROUND OF THE INVENTION

As shown in FIG. 5, the conventional back mirror comprises a base plate 50 and a mirror housing 60 provided in a detachable manner. A permanent magnet 52 is buried on an assembly plane 51 of the base plate 50 and a metal piece 62 is buried on an assembly plane 61 of the mirror housing 60 at a position corresponding to the position of the permanent magnet 52 so as to be coupled by means of magnetic attraction. Through-holes 53, 63 respectively are provided at the centers of the assembly planes 51, 61 of the base plate 50 and the mirror housing 60, with the through-hole 53 being smaller than the through-hole 63. A pin slot 54 is provided at a side of the through-hole 53; and a drop preventing wire 70 having a stopper at the end thereof is provided in such a manner that it should be able to freely pass through the through-hole formed at the leading end of a mirror supporting plate. The stopper of the drop preventing wire 70 should prevent the dropping of the mirror housing 60.

The conventional back mirror as described above has the advantages of ease of assembly and increased productivity and joining the base plate and the mirror housing, is simplified and a saving of the manufacturing cost is realized owing to the decreased number of components.

However, the absorption of the impacts and vibrations during a running is done only by means of magnetic forces of a permanent magnet, and therefore, there is the possibility that the mirror housing which is coupled with the base plate can be displaced relative to the latter. Consequently, the posture of the mirror housing is deviated from the driver's observing angle, with the result that the back mirror loses the intended function.

Particularly, when the impacts and vibrations of the car body are severe, the wire serves as the only means for preventing the dropping of the mirror housing, and therefore, the supporting structure is not strong enough. Further, in the case where the mirror housing is to be recoupled with the base plate after a detachment, there is no physical criteria for the coupling, and therefore, too much attention is demanded to the driver. In such a case, the recoupling is apt to be done in an incorrect manner, and therefore, there are usually required repetitions of the coupling procedure.

SUMMARY OF THE INVENTION

The present invention is intended to overcome the above described disadvantages of the conventional techniques.

Therefore it is an object of the present invention to provide an outside back mirror for an automobile, which is not displaced and dropped under any impacts or vibrations, thereby performing the intended function in a perfect manner.

It is another object of the present invention to provide an outside back mirror for an automobile, in which the structure is simplified and the number of the components required is decreased, thereby contributing to improving productivity and saving in the manufacturing cost.

In achieving the above objects, the back mirror of the present invention is constructed such that the mirror housing and the base te are coupled with each other by means of a magnetic force, and a hinge structure is installed on both the mirror housing and the base plate in an elastic manner by means of a coil spring, so that, even after detachment of the mirror housing, the mutual connection state of the mirror housing and the base plate should be maintained.

To describe it in more detail, the outside back mirror according to the present invention is constructed such that the base plate and the mirror housing are coupled in a detachable manner. A retaining section is provided on the inside of the assembling plane of the base plate, a through-hole on the rear center thereof; and metal pieces at the opposite sides thereof. A fitting groove is formed on the rearmost portion of the assembling plane of the base so as for the groove to receive the upper insertion rod of the hinge structure. A groove is provided in such a manner that it should extend along the middle portion of the assembling plane of the mirror housing, and it should have a spring hanging groove. Retaining sections are provided through the opposite sides thereof and a through-hole is formed at the center thereof. Permanent magnets are buried at the opposite sides of the through hole; a fitting slot is formed at the rearmost position thereof for receiving the lower insertion rod of the hinge structure. A spring is coupled with the upper insertion rod of the hinge structure, with one end of the spring being engaged with the spring hanging groove, and with the other end of the spring being engaged with the body of the hinge structure. The upper and lower insertion rods of the hinge structure are inserted into the retainers of the base plate and mirror housing, in such a manner that the mirror housing should be connected with the base plate through the hinge structure so as for the mirror housing to be pivoted through the hinge structure.

In the back mirror of the present invention as described above, the base plate is secured at each of the front doors, and the mirror housing is connected to the base plate by means of the hinge structure. Under such condition, if the mirror housing is pushed in the direction of the arrow mark of the solid line as shown in FIG. 1, the mirror housing is pivoted around the hinge structure which is serving as the hinge pin. If the mirror housing is pivoted by a certain angular interval, then the mirror housing is spontaneously pivoted owing to the elastic force of the spring, and thereafter, the permanent magnets installed on the mirror housing are attracted toward the metal pieces installed on the base plate.

During such a coupling procedure, the hinge structure plays a guiding role, and therefore, the coupling is carried out in an exact way without any misalignment. In a coupled state (refer to FIGS. 2 and 3), the upper and lower insertion rods of the hinge structure are received into the fitting grooves so that there should remain no gaps between the two assembling planes, and that the mirror housing should be firmly attached without being moved in spite of impacts and vibrations.

Further, the hinge structure is capable of holding the mirror housing even after the mirror housing is departed from the base plate, and therefore, the connection state of the mirror housing is maintained all the time, thereby preventing the dropping of the mirror housing to the ground.

BRIEF DESCRIPTION OF THE DRAWINGS

The above objects and other advantages of the present invention will become more apparent by describing in detail the preferred embodiment of the present invention with reference to the attached drawings in which;

FIG. 5 is an exploded perspective view of a conventional outside back mirror.

DESCRIPTION OF THE PREFERRED EMBODIMENT

Figure 1:
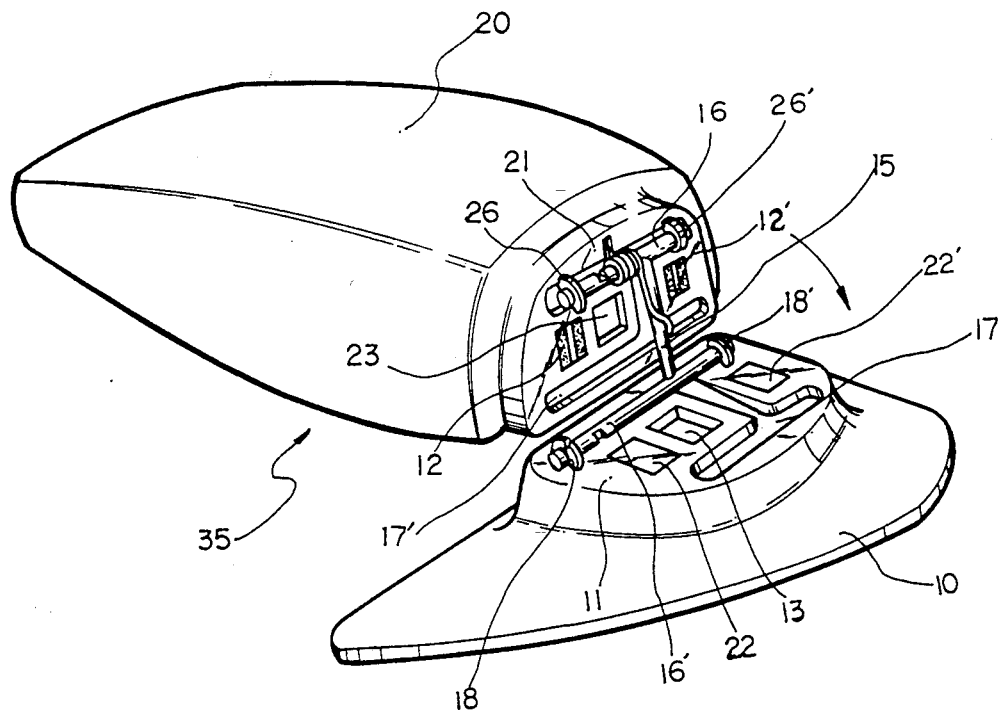
FIG. 1 is a perspective view of the device of the present invention, with the mirror housing open.
Figure 4:
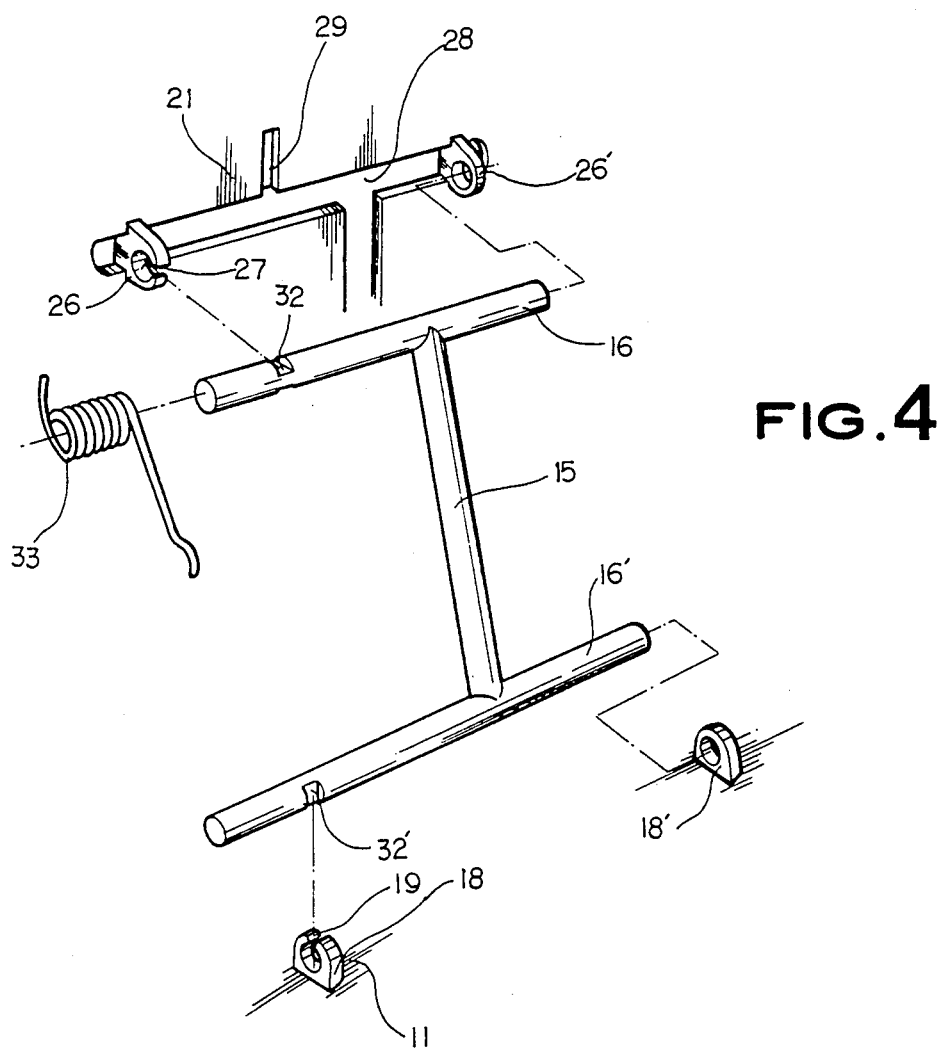
FIG. 4 is a perspective view showing the critical portion of the hinge section.

Referring to FIGS. 1 and 4, the side view or back mirror 35 according to the present invention comprises a mounting housing or base plate 10, a hinge structure 15 and a mirror housing 20. Retaining sections 18, 18' are provided on the assembling plane 11 of the base plate 10 and the retaining section 18 is provided with an opening 19, while a through hole 13 is formed at the center of the assembling plane 11 of the base plate 10. Metal pieces 22, 22' are buried at the opposite sides of the through hole 13, and a recess or fitting groove 17 for receiving pivoting means, for example, an upper insertion rod 16 of the hinge structure 15 is provided at the rearmost position of the plane 11.

Meanwhile, on an assembling plane 21 of the mirror housing 20, which opposingly faces the assembling plane 11, there are provided retaining sections 26, 26'. The retaining section 26 is provided with an opening 27 and a recess or groove 28 is formed between the retaining section 26 and the retaining section 26'. A spring hanging groove 29 is added on the top of the groove 28 and a through hole 23 is formed at the center of the plane 21. Permanent magnets 12, 12' are buried at the opposite sides of the through hole 23; and a fitting groove 17' for receiving the lower insertion rod 16' of the hinge structure 15 is formed at a rearmost position of the plane 21.

Figure 2:
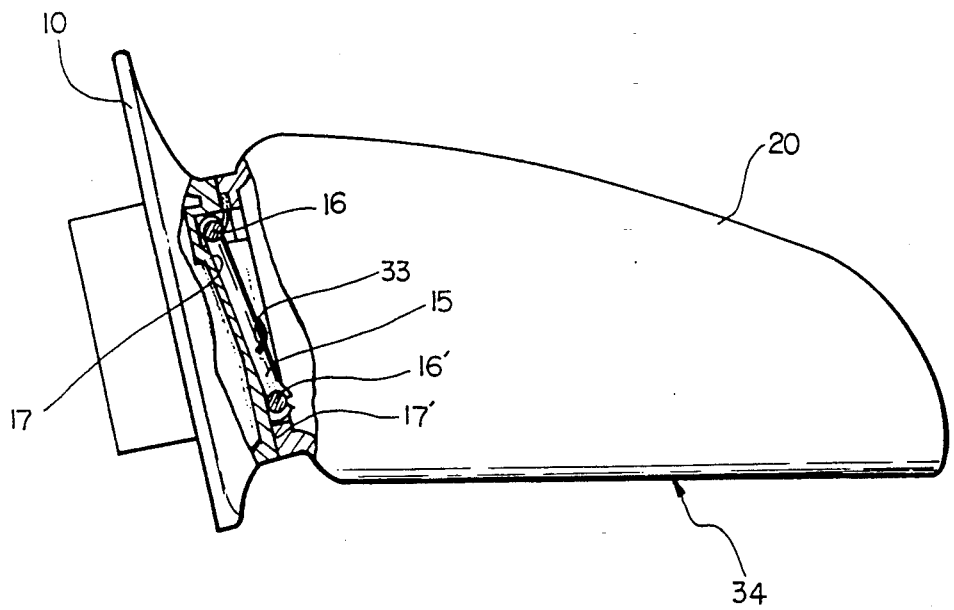
FIG. 2 is a view showing a cut-out portion of the mirror housing and base plate, while in a coupled state or operative position.
Figure 3:
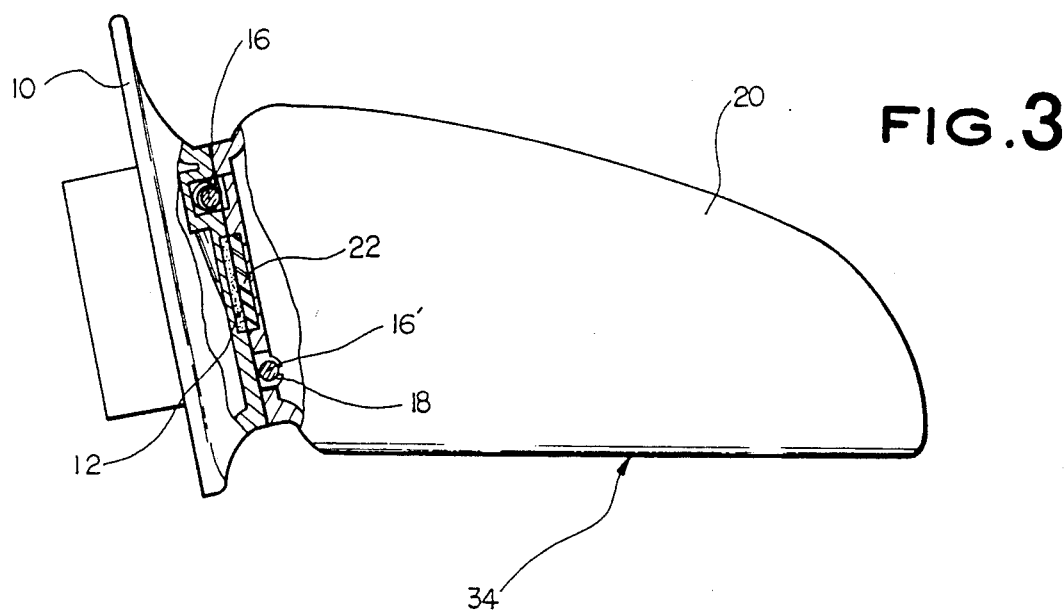
FIG. 3 is a view showing a cut-out portion of the mirror housing and base plate, while in a coupled state or operative position.

It should be appreciated that the permanent magnets 12, 12' and the metal pieces 22, 22' are for the purpose of maintaining the mirror housing 20 in a closed operative position, as shown in FIGS. 2 and 3, and any means suitable for securing the mirror housing 20 in such a position can be used.

Further, guiding sections 32, 32' are provided on the insertion rods 16, 16' of the hinge structure 15 near the end portions thereof.

Reference codes 33 and 34 in the drawing indicate a coil spring and a mirror, respectively.

The outside back mirror as described above is assembled in a manner described below.

Biasing means, for example, a coil spring 33 is coupled with the upper insertion rod 16 of the hinge structure, and one of the ends of the coil spring 33 is engaged with the spring hanging groove 29, while the other end of the coil spring 33 is engaged with the body of the hinge structure 15. The opposite ends of the upper insertion rod of the hinge structure 15 are inserted into the retaining sections 26, 26' of the mirror housing 20, in such manner that one end of the upper insertion rod 16 is inserted into the retaining section 26', and the guiding section 32 of the upper insertion rod 16 is fitted to the opening 27 of the retaining section 26, before the upper insertion rod 16 is pushed into the opening 28. In this way, the upper insertion rod 16 is fitted into the retaining sections 26, 26', and this results in joining of the hinge structure with the mirror housing 20.

In this state, the lower insertion rod 16' is also fitted with the retaining sections 18, 18' of the base plate 10, in such a manner that the guiding section 32' of the lower insertion rod 16' is matched with the opening 19 of the retaining section 18 and is pushed into the retaining hole of the retaining section 18, thereby completing the fitting of the lower insertion rod 16' with the retaining sections 18, 18'. As such, the mirror housing 20 and the base plate 10 are coupled, and the back mirror 35 is assembled.

The device of the present invention as described above has the results as presented below.

As shown in FIG. 1, the mirror housing 20 pivots about the lower insertion rod 16' to an open inoperative position. As indicated by the arrow, the mirror housing 20 can be pivoted back to a closed operative position, with the closed operative position and open inoperative position having an angular difference of about 90°. Moreover, it should be appreciated that the mirror housing 20 can be pivoted about the upper insertion rod 16 to another open inoperative position which also has an angular difference of about 90° with the closed operative position. Thus, the angular difference between the two open inoperative positions is about 180°.

In addition to the fact that the mirror housing is attached to the base plate by means of the magnetic forces of permanent magnets as in the case of the conventional devices, the device of the present invention adds a hinge structure which performs not only a connecting function but also a pivoting function. In this way, the mirror housing is coupled with the base plate in a dual form, and therefore, the mirror housing will withstand against all kinds of impacts and vibrations. Therefore, the outside back mirror of the present invention will perform the intended functions, and in addition, the simple structure and the small number of the components will contribute to saving manufacturing costs and improving productivity.

What is claimed is:

1. A side view mirror for automobiles, comprising:
   a mounting housing having an inner side and an outer side, said inner side for connecting to an automobile and said outer side having formed thereon a first mounting housing recess, and a second mounting housing recess having one end which connects with the first mounting housing recess and being substantially perpendicular with the first mounting housing recess;
   a mirror housing having a first side and a second side adjacent to said first side, said first side having a mirror disposed thereon for viewing along a side of an automobile, and said second side having formed thereon a first mirror housing recess corresponding to said first mounting housing recess, a second mirror housing recess corresponding to said second mounting housing recess, and a third mirror housing recess, said second mirror housing recess having one end which connects with the third mirror housing recess, another end which connects with said first mirror housing recess, and said second mirror housing recess being substantially perpendicular with the first and third mirror housing recesses;

first pivoting means connected to said outer side of said mounting housing and communicating with said first mounting housing recess and said first mirror housing recess, for alternatively pivoting the mirror housing from a closed operative position to a first open inoperative position;

second pivoting means connected to said second side of said mirror housing and communicating with said third mirror housing recess, for alternatively pivoting said mirror housing from said closed operative position to a second open inoperative position;

connecting means communicating with said second mounting housing recess and said second mirror housing recess, for connecting said first pivoting means and said second pivoting means;

biasing means connected to at least one of said pivoting means for restoring said mirror housing from an open inoperative position back to its closed operative position; and securing means for maintaining said mirror housing in its closed operative position until said mirror housing is pivoted;

said second side of said mirror housing being substantially flush against said outer side of said mounting housing when said mirror housing is in its closed operative position.

2. A side view mirror for automobiles according to claim 1, wherein said first pivoting means comprises a first rod.

3. A side view mirror for automobiles according to claim 2, wherein said first rod connects to said second side of said mirror housing by a plurality of first retaining section.

4. A side view mirror for automobiles according to claim 3, wherein a portion of said first rod has an indentation formed thereon and at least one of said first retaining sections forms an opening for receiving the indented portion of the first rod.

5. A side view mirror for automobiles according to claim 1, wherein said second pivoting means comprises a second rod.

6. A side view mirror for automobiles according to claim 5, wherein said second rod connects to said outer side of said mounting housing by a plurality of second retaining sections.

7. A side view mirror for automobiles according to claim 6, wherein a portion of said second rod has an indentation formed thereon and at least one of said second retaining sections forms an opening for receiving the indented portion of the second rod.

8. A side view mirror for automobiles according to claim 1, wherein said biasing means comprises a spring.

9. A side view mirror for automobiles according to claim 1, wherein said securing means comprises magnetic means having at least one magnet disposed on said second side of said mirror housing and a corresponding metal plate disposed on said outer side of said mounting housing.

10. A side view mirror for automobiles according to claim 1, wherein said first open inoperative position and said second open inoperative position have an angular difference of about 180°.

* * * * *